United States Patent
Domingo et al.

(10) Patent No.: US 9,522,740 B2
(45) Date of Patent: Dec. 20, 2016

(54) METHOD AND A DEVICE FOR PROTECTING AN OVERSPEEDING ROTORCRAFT ENGINE

(71) Applicant: AIRBUS HELICOPTERS, Marignane (FR)

(72) Inventors: Benoit Domingo, Aix en Provence (FR); Guillaume Dumur, Salon de Provence (FR); Stephane Bailly, Cabries (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 14/303,056

(22) Filed: Jun. 12, 2014

(65) Prior Publication Data

US 2015/0006057 A1 Jan. 1, 2015

(30) Foreign Application Priority Data

Jun. 27, 2013 (FR) ...................................... 13 01510

(51) Int. Cl.
*B64D 31/06* (2006.01)
*F01D 21/02* (2006.01)

(52) U.S. Cl.
CPC .............. *B64D 31/06* (2013.01); *F01D 21/02* (2013.01); *F05D 2220/329* (2013.01); *F05D 2270/331* (2013.01); *Y02T 50/671* (2013.01)

(58) Field of Classification Search
CPC .......... B64C 27/00; B64C 27/04; B64C 27/06; B64C 27/08; B64C 27/12; B64D 31/00; B64D 31/06; F01D 21/02; F05D 2270/331; F05D 2220/329; Y02T 50/671
See application file for complete search history.

(56) References Cited

U.S. PATENT DOCUMENTS

| 3,938,320 A * | 2/1976 | Nelson ....................... F02C 7/26 416/30 |
| 3,963,372 A * | 6/1976 | McLain et al. ................. 416/30 |
| 4,619,110 A | 10/1986 | Moore |
| 2003/0135306 A1* | 7/2003 | Driscoll et al. .................... 701/3 |
| 2007/0240426 A1* | 10/2007 | Wiegman et al. ............... 60/793 |
| 2008/0283671 A1 | 11/2008 | Cherepinsky et al. |

(Continued)

FOREIGN PATENT DOCUMENTS

| FR | 2962165 | 1/2012 |
| FR | 2967213 | 5/2012 |
| WO | 2005119012 | 12/2005 |

OTHER PUBLICATIONS

French Search Report for FR 1301510, Completed by the French Patent Office on Mar. 6, 2014, 6 Pages.

*Primary Examiner* — Jerrah Edwards
*Assistant Examiner* — Tamara Weber
(74) *Attorney, Agent, or Firm* — Brooks Kushman P.C.

(57) ABSTRACT

A method of stopping an overspeeding engine (4) of a rotorcraft (1). A protection device stops the overspeeding engine (4) on condition of a comparison between a mechanical power requirement (19) of the rotorcraft (1) and a predefined power threshold (22). Stopping of the overspeeding engine (4) is authorized by the protection device (8) on condition that said mechanical power requirement (19) is identified as being less than or equal to the predefined power threshold (22). The mechanical power requirement (19) of the rotorcraft (1) is calculated on the basis of at least one current or anticipated value for the opposing torque (15) of a main rotor (5) of the rotorcraft.

10 Claims, 1 Drawing Sheet

(56) References Cited

U.S. PATENT DOCUMENTS

| | | | | |
|---|---|---|---|---|
| 2011/0173988 A1* | 7/2011 | Sweet | ................... | B64D 31/06 60/773 |
| 2012/0116613 A1 | 5/2012 | Daumas | | |
| 2013/0098042 A1 | 4/2013 | Frealle et al. | | |
| 2014/0297155 A1* | 10/2014 | Chen | ....................... | F02C 9/28 701/100 |

* cited by examiner

METHOD AND A DEVICE FOR PROTECTING AN OVERSPEEDING ROTORCRAFT ENGINE

CROSS REFERENCE TO RELATED APPLICATION

This application claims priority to French patent application No. FR 13 01510 filed on Jun. 27, 2013, the disclosure of which is incorporated in its entirety by reference herein.

BACKGROUND OF THE INVENTION (1) Field of the Invention

The present invention relates to the field of methods and devices for controlling the operation of rotorcraft engines. More specifically, the present invention relates to methods and devices for protecting a rotorcraft engine by causing the engine to stop if it is in an overspeed situation.

(2) Description of Related Art

Rotorcraft are rotary wing aircraft in which at least lift is provided by at least one main rotor having a substantially vertical axis. In the specific context of a helicopter, the main rotor provides the rotorcraft not only with lift, but also with propulsion to advance in any direction.

Rotorcraft are also fitted with an anti-torque device that guides them in yaw, such as at least one auxiliary rotor having an axis that is substantially horizontal. By way of example, such an auxiliary rotor is a tail rotor, or else it may be formed by a propulsive propeller in the context of a helicopter having high propulsion speed. It is possible to use other anti-torque devices, such as for example anti-torque devices that blow air.

The flight attitude of a rotorcraft can be modified by a pilot imparting collective and/or cyclic variation to the pitch of the blades making up the rotary wing of the main rotor. Collective variation of the pitch of the blades of the main rotor serves to modify the lift applied to the rotorcraft and consequently enables it to move in a vertical direction. Cyclic variation of the pitch of the blades of the main rotor serves to modify the propulsion of the rotorcraft along other propulsion directions in the specific circumstance of a helicopter.

Furthermore, variation in the collective pitch of an auxiliary rotor or making use of any other anti-torque device serves to stabilize the progress of the rotorcraft in yaw.

The rotor(s) of a rotorcraft is/are conventionally driven in rotation by a power plant comprising one or more fuel-burning engines, in particular turboshaft engines. The engine(s) is/are synchronously engaged with a mechanical power drive train leading to the rotor(s) in order to drive it/them in rotation.

In addition, the power plant is used for driving rotation of various power absorber members of the rotorcraft that are engaged with the mechanical power drive train. Such power absorber members comprise, for example: a compressor of a heating, ventilating, and/or air conditioning system, or any other member that needs to be driven in rotation.

The engine(s) is/are commonly under the control of a regulator unit that controls their operation depending on the flight attitude and on the environment outside the rotorcraft. One such regulator unit is of the type commonly referred to as a full authority digital engine control (FADEC).

Depending on rotorcraft type, the use of a regulator unit is potentially directly dependent on flight commands issued by the pilot, or else it depends on regulation orders delivered by a control unit of the rotorcraft.

One such control unit is of the type commonly referred to as automatic flight control system (AFCS) and it delivers setpoints to the regulator unit for controlling the supply of fuel to the engine(s), depending on the needs of the rotorcraft. Such setpoints commonly relate to a desired speed of rotation at which the main rotor is to be driven in rotation by the engine(s).

In this context, it is necessary to protect the engine(s) from being caused to rotate at a speed that is excessive, commonly referred to as "overspeed".

More particularly in the event of overspeed, the engine must be stopped in order to protect the members of the rotorcraft that are driven by the engine, and in particular, the rotor(s) and the blades of its rotary wing. It is also desirable to avoid damaging the engine. For this purpose, it is common practice for operation of a rotorcraft engine to depend on a protection device for protecting its individual operation.

In the event of engine overspeed being detected, the protection device causes it to be stopped immediately. Such a protection device is typically formed by a digital control circuit placed on the logic control path(s) for enabling the regulator unit to control the operation of the engine(s). Nevertheless, a sudden stop of the engine will lead to a situation that is uncomfortable for the pilot, who then needs to intervene rapidly on the behavior of the rotorcraft.

In a single-engine rotorcraft, the engine stopping requires the pilot to perform a rapid and difficult intervention that consists in putting the main rotor into autorotation so as to avoid a severe incident.

With a multi-engine rotorcraft, the main rotor continues to be driven in rotation by at least one other engine in the event of one engine failing. Since it is improbable that all of the engines of a rotorcraft will start overspeeding simultaneously, in the event of overspeed it is known to make use of a crossed mode for stopping engines.

In crossed stop mode, the operation of an engine that is still powered is maintained whatever its speed, on condition that a special mode of operation is applied for protecting it, such as a mode of control commonly referred to as one engine inoperative (OEI) mode.

In the event of an engine failing, at least one other available engine operating in OEI mode delivers a setpoint power for a predefined duration so as to enable the rotorcraft to continue flying temporarily in spite of one of the engines being unavailable.

For information about a technological background close to the present invention, reference may be made to Documents FR 2 967 213 (Eurocopter France) and FR 2 962 165 (Turbomeca), which describe such devices for protecting an overspeeding engine.

It is found that immediately stopping an overspeeding engine can be inappropriate during certain difficult stages of flight of the rotorcraft. As mentioned above, immediate stopping of an engine puts the pilot in an uncomfortable situation of needing to react rapidly on the behavior of the rotorcraft with power resources that are diminished or non-existent.

That is why proposals have been made to restrict the full authority of the protection device for causing the engine to stop in the event of engine overspeed being detected. Proposals have been made in particular to make immediate stopping of an overspeeding engine by the protection device conditional on specific stages of flight of the rotorcraft.

For example, in Document EP 1 753 939 (Goodrich Pump & Engine Control Systems Inc.), proposals are made to take account of the altitude at which the rotorcraft is flying in order to authorize the protection device to stop an overspeeding engine. More specifically, when the rotorcraft is flying at high altitude, the protection device has full authority to prevent fuel being supplied to an overspeeding engine. However, at lower altitude when the rotorcraft is close to the ground, immediate stopping of an overspeeding engine is prevented by inhibiting the operation of the protection device.

Nevertheless, such a solution is unsatisfactory. Taking account of the altitude at which the rotorcraft is flying in order to authorize or prevent an immediate stop of an overspeeding engine is not well adapted to keeping the rotorcraft under the safest possible flying conditions. At high altitude, it may be inappropriate to allow an overspeeding engine to be stopped immediately given the overall state of the rotorcraft. At low altitude, stopping of the overspeeding engine is prevented regardless of the state of flight of the rotorcraft, and thus in itself runs the risk of putting the rotorcraft in a dangerous situation.

Proposals are also made in U.S. Pat. No. 4,619,110 (M. S. More) to restrict the full authority of the protection device to cause the engine to stop on the basis of the pilot activating a control button installed on a flight control member.

Nevertheless, such a solution is unsatisfactory insofar as the pilot, when confronted with an emergency situation and under nervous strain, will then tend always to take advantage of the possibility made available of restricting the full authority of the protection device in order to continue benefiting of optimal power capacity from engine.

It therefore appears appropriate to find reasonable criteria suitable for achieving a satisfactory compromise between the possibility of immediately stopping an overspeeding engine and keeping the engine running as long as possible in order to have the safest possible flying conditions for the rotorcraft and in order to make piloting more comfortable, with this being done by means of a solution that is reliable and easy to implement.

BRIEF SUMMARY OF THE INVENTION

On the basis of the above observation and needs, the object of the present invention is to provide a method and a device for stopping an overspeeding rotorcraft engine by searching for ways of authorizing or preventing such stopping that satisfy the looked-for compromise as well as possible. It is also desirable that such a method and device should be applicable both to a single-engine rotorcraft and to a multi-engine rotorcraft and should be applicable regardless of the structural organization of the rotorcraft.

The method of the present invention is a method of stopping an overspeeding engine of the rotorcraft. The rotorcraft has at least one said engine for driving power absorber members of the rotorcraft. Said power absorber members comprise at least a rotor of the rotorcraft, said rotor at least comprising at least a main rotor having a substantially vertical axis.

The method of the present invention comprises an operation of detecting overspeeding of said engine and an operation of detecting at least one specific stage of flight of the rotorcraft. Said stage of flight determines whether or not use is to be made of a protection device for stopping the engine in the event of overspeed being detected.

In the present invention, such a method is recognizably mainly in that said specific stage of flight is identified by a mechanical power requirement of the rotorcraft that needs to be delivered by said at least one engine. Stopping of the overspeeding engine by the protection device depends on a comparison operation being performed between said mechanical power requirement and a predefined power threshold. The overspeeding engine is stopped by the protection device on condition that said mechanical power requirement is identified as being less than or equal to the predefined power threshold.

Taking account of the mechanical power requirement in order to prevent the operation of the overspeeding engine being stopped provides a human pilot of the rotorcraft with piloting comfort.

In the event of engine overspeed being detected, the human pilot then has a useful amount of reaction time made available, allowing the human pilot to take decisions calmly for modifying the flight attitude of the rotorcraft before actually stopping the overspeeding engine.

Such piloting comfort made possible by the invention can be obtained by means of a protection device that is simple in structure and regardless of the conditions in the environment outside the rotorcraft and regardless of the structural arrangement of the rotorcraft. Continued flight of the rotorcraft in the event of engine overspeed is made safe on the basis of a small amount of information of the kind commonly supplied by the on-board instrumentation of the rotorcraft and making it possible to deduce the mechanical power requirement.

The piloting comfort made available by the invention is obtained independently and without being subjected to taking account of a variety of ways in which the rotorcraft may be flying. Potential conflicts are avoided between various criteria that might otherwise need to being taken into account individually or collectively in order to identify said various ways of flying the rotorcraft.

It should also be noted that, in the event of engine overspeed, safe flying conditions for the rotorcraft can be optimized preferably by taking account of an anticipated mechanical power requirement of the rotorcraft deduced from the current state of flight of the rotorcraft. Such an anticipated power requirement is deduced in particular from information that is commonly supplied by the instrumentation on board the rotorcraft, such as from current flight commands generated by a pilot of the rotorcraft in order to vary the pitch of the blades of said at least one rotor.

The current state of flight of the rotorcraft is typically identified by on-board instrumentation of the rotorcraft in order to define said mechanical power requirement. Depending on the current state of flight of the rotorcraft, the on-board instrumentation supplies information from which the mechanical power requirement of the rotorcraft can be deduced by calculation, in particular on the basis of information about the opposing torque(s) generated by at least one of the power absorber members driven by the engine.

In order to deduce said mechanical power requirement, account is taken more particularly at least of the opposing torque(s) generated by the rotor(s) of the rotorcraft, and more particularly by the main rotor providing at least the essential function of providing the rotorcraft with lift.

In the current situation in which the rotorcraft has an anti-torque device, said mechanical power requirement is deduced potentially by taking account of the opposing torque generated by the anti-torque device using a power absorber member engaged with the engine. Account is taken in particular of the opposing torque of an auxiliary rotor of substantially horizontal axis of the rotorcraft, or indeed for example of the opposing torque from an air compressor used by an anti-torque device that blows air.

Said power threshold is determined in particular depending on the structure of the rotorcraft and more particularly depending on its engine capacities and its weight, or indeed depending on its ability to withstand forces, in particular concerning the main rotor. For a rotorcraft of given structure, the power threshold corresponds to a mechanical power level that is considered as being critical with respect to safe flying conditions of the rotorcraft in the event of the engine stopping and given the current state of flight of the rotorcraft as evaluated by the on-board instrumentation.

It should be considered that the power threshold is potentially a predefined threshold of predetermined value or is potentially a current power threshold of variable value calculated depending on the current state of flight of the rotorcraft, in particular by taking account of the known dynamic behavior of the engine and not only of criteria having values that are pre-established depending on the structure of the rotorcraft, but also on criteria having values that are variable, with their current values being identified by the on-board instrumentation of the rotorcraft.

Such criteria having variable values are pre-established, e.g. relating to conditions in the environment outside the rotorcraft, optionally when putting at least one of said power absorber members into operation, such as a heating, ventilating, and/or air conditioning system, or indeed such as a reversible electrical machine engaged on the mechanical drive train between the engine and the rotor(s), and/or possibly also relating to the current weight of the rotorcraft. The criteria of variable values may also relate to conditions in which the rotorcraft is being operated, such as operation in a combat situation. The current weight of the rotorcraft may take account not only of the intrinsic weight of the rotorcraft, but also of the weight of fuel on board and/or the weight of a possible cargo.

More particularly, the method of the present invention comprises the following operations:

depending on the current state of flight of the rotorcraft, deducing the mechanical power requirement of the rotorcraft by calculation. The mechanical power requirement is calculated in particular by identifying at least one opposing torque generated by at least one of said power absorber members including at least said at least one main rotor, or indeed possibly also by an anti-torque device fitted to the rotorcraft such as an auxiliary rotor having a substantially horizontal axis and/or any other mechanical power absorber member driven by the engine. Then, comparing the previously deduced mechanical power requirement with said power threshold. At the end of this comparison operation, generating a setpoint identifying the mechanical power requirement relative to said power threshold;

also detecting the speed of rotation of the engine. In the event of engine overspeed, making stopping of the engine by the protection device conditional on the previously generated setpoint.

As mentioned above, the mechanical power requirement is potentially deduced from a current value of said at least one opposing torque.

Nevertheless, the mechanical power requirement is preferably deduced from an anticipated value of said at least one opposing torque. Such an anticipated value is calculated in particular on the basis of data concerning the state of flight of the rotorcraft as supplied by on-board instrumentation of the rotorcraft and relating to changes in the attitude of the rotorcraft, in accordance at least with flight controls operated by a pilot of the rotorcraft, either a human pilot or an autopilot.

Under such circumstances, and more particularly, said data concerning the state of flight relates at least to the flight commands generated by a pilot of the rotorcraft modifying the pitch of the blades of said at least one rotor. It can be understood that said flight commands are potentially generated by manual control members operated by a human pilot and/or are potentially generated by an autopilot of the rotorcraft.

The calculation of the anticipated mechanical power requirement takes account at least of a command for varying the pitch of the blades of the main rotor, and possibly also for varying the pitch of the blades of at least one auxiliary rotor, in order to provide data concerning the flight state of the rotorcraft that makes it possible to anticipate the mechanical power requirement. In this context, reference may be made for example to Document US 2008/0283671 (Sikorsky Aircraft Corp.).

In an implementation, when the mechanical power requirement is identified by said setpoint as being greater than or equal to said power threshold, the protection device prevents the detector means from causing the overspeeding engine to stop.

For example, generation of the setpoint causes a break in the continuity of the logic path for transmitting a stop order to the regulator means controlling the engine, the stop order for stopping the engine being generated by the detector means identifying an overspeed situation of the engine.

By way of example, generating the setpoint causes a switch placed on said logic path to be operated. Operating the switch prevents said stop order to stop the engine as generated by the detector means identifying an overspeed situation of the engine from passing through the logic path.

In another implementation, when the mechanical power requirement is identified by said setpoint as being less than or equal to said power threshold, the detector means are authorized by the protection device to cause the overspeeding engine to stop.

For example, both the setpoint and also a stop order for stopping the engine generated by the detector means identifying a situation in which the engine is in overspeed, are processed jointly by calculation to generate a stop command for stopping the engine that is applied to the regulator means controlling the engine.

Said regulator means are potentially formed by means for feeding electricity to the engine and/or are potentially formed by means for metering the supply of fuel to the engine. It should also be understood that the means used by the method of the present invention are potentially incorporated at least in part in a unit for controlling the operation of the engine, such as a FADEC type unit.

The present invention also provides a device for protecting an engine that is suitable for stopping the engine in the event of detecting engine overspeed by implementing a method as described above.

More particularly, said protection device is of the type comprising means for detecting the speed of rotation of the engine and means for generating an order to stop the engine in the event of the detector means detecting an overspeed situation of the engine. The operation of the protection device is dependent on means for determining a specific stage of flight of the rotorcraft determining whether or not use is to be made of the engine being stopped by the protection device in the event of a said identification of the engine overspeeding.

In the present invention, such a protection device is fitted with:

calculation means comprising at least a first calculator and a second calculator. The first calculator has means for deducing the mechanical power requirement of the rotorcraft by calculation, which means are in communication with the second calculator. The second calculator has means for comparison by calculation between the mechanical power requirement as transmitted by the first calculator and the power threshold. The second calculator also has means for generating the setpoint;

generator means for generating a stop command for the engine by the protection device with operation thereof depending on the detector means and on the calculation means.

In an embodiment, the first calculator is a tool for calculating the mechanical power requirement as a function of data concerning the state of flight of the rotorcraft as provided in particular by on-board instrumentation of the rotorcraft and relating at least to an opposing torque generated by at least one of said power absorber members, and more particularly by at least one of the rotors, including at least one main rotor.

It is nevertheless preferable to optimize safe flying conditions of the rotorcraft in the event of engine overspeed by taking account of an anticipated mechanical power requirement.

To this end, the first calculator is preferably a tool for calculating the mechanical power requirement by taking account of an anticipated mechanical power requirement as a function of anticipated flight state data of the rotorcraft identified on the basis at least of flight commands generated by a pilot of the rotorcraft, either a human pilot or an autopilot. Said flight commands give rise to variation in the pitch of at least one of the rotors, in particular a main rotor, and indeed causes an anti-torque device to be put into operation, in particular one or more auxiliary rotors.

The data concerning the anticipated state of flight of the rotorcraft may also be identified by taking account of commands for using on-board equipment of the rotorcraft that is driven by the engine, such as for example a heating, ventilating, and/or air conditioning system, and/or an electrical machine of the rotorcraft.

The first calculator is potentially in direct communication with the on-board instrumentation of the rotorcraft, and in particular with members of the rotorcraft that generate said flight commands. The first calculator may also be in communication with or be incorporated in a calculation interface for calculating said anticipated value of the opposing torque generated by said at least one rotor.

Such a calculation interface is in particular advantageously included in a control unit of the rotorcraft, such as a unit of the automatic flight control system (AFCS) type, or an analogous control unit. Under such circumstances, the calculation interface is in communication with the on-board instrumentation of the rotorcraft to generate orders for using the regulator unit controlling the operation of the engine.

In an embodiment, the means for generating the stop command comprise prevention means for preventing transmission of a stop order for stopping the engine as generated by the detector means. Under such circumstances, operation of the prevention means depends on the calculation means.

By way of example, said prevention means are located in a logic path for transmitting the stop order for stopping the engine as generated by the detector means. Under such circumstances, the means for generating the stop command potentially incorporate the detector means, the stop command being derived from the stop order generated by the detector means.

By way of example, the prevention means comprise a switch having a relay with operation of the relay depending on the setpoint being generated by the calculation means.

It should be understood that depending on the architecture of said logic path and on the organization of the regulator means for controlling the operation of the engine, said relay switch is potentially a switch that is normally open or a switch that is normally closed.

In another embodiment, the means for generating a stop command for stopping the engine comprise a third calculator for jointly processing by calculation both the setpoint and the stop order for stopping the engine as generated by the detector means.

The present invention also provides a rotorcraft fitted with a protection device as described above. The rotorcraft is potentially a single-engine rotorcraft or a multi-engine rotorcraft. With a multi-engine rotorcraft, each of the engines is fitted with its own protection device that can be operated in a said crossed engine stop mode in the event of overspeed.

BRIEF DESCRIPTION OF THE SEVERAL VIEWS OF THE DRAWINGS

Embodiments of the present invention are described with reference to the figures of the accompanying sheet, in which.

DETAILED DESCRIPTION OF THE INVENTION

Figure 1:
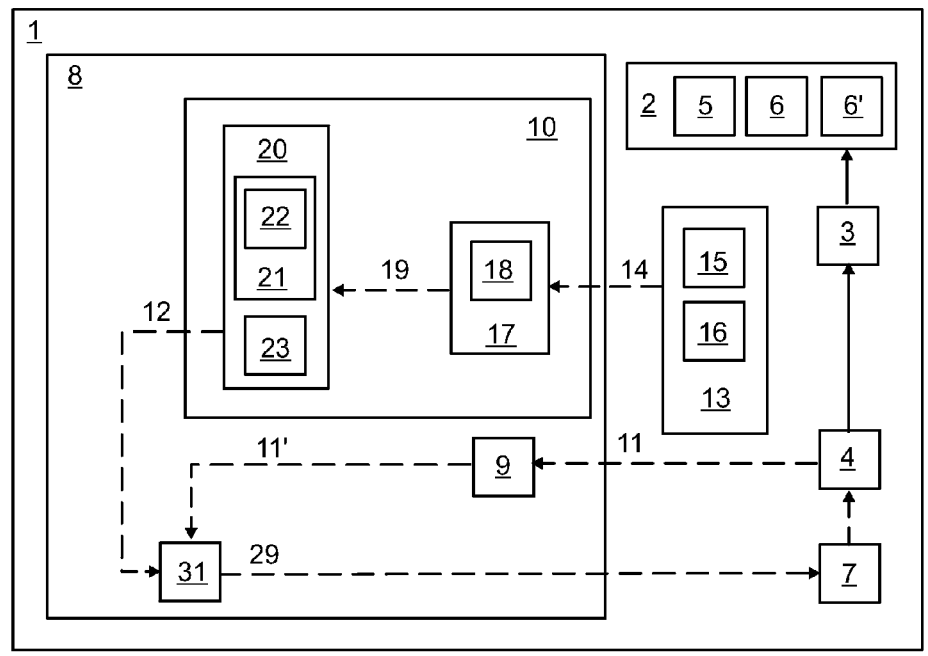
FIG. 1 is a diagrammatic representation of a rotorcraft fitted with a device of the present invention for stopping an engine of the rotor in an overspeed situation.

In FIG. 1, a rotorcraft 1 has mechanical power absorber members 2 driven in rotation by a main gearbox (MGB) 3. The MGB 3 is itself in rotary engagement with a drive shaft driven in rotation by at least one engine 4 of the rotorcraft 1. The mechanical power absorber members 2 comprise in particular at least one main rotor 5 having an axis that is substantially vertical, and also an anti-torque device such as formed by at least one auxiliary rotor 6 having an axis that is substantially horizontal and/or on-board equipment 6' of the rotorcraft 1, such as a heating, ventilating, and/or air conditioning system, and/or such as an electrical machine.

It is useful to protect the members of the rotorcraft 1 driven by the motor 4 when in an overspeed situation, while nevertheless facilitating temporary progress of the rotorcraft 1 in safe flight to a landing zone, including by putting the main rotor 5 into auto-rotation. For this purpose, stopping of the engine 4 in overspeed depends on taking account of the mechanical power needs of the rotorcraft, and essentially of the current or anticipated mechanical power needs of at least the main rotor 5.

More particularly, the use of means 7 for regulating the operation of the engine 4 depends on a protection device 8 of the engine 4 causing the engine to be stopped in the event of overspeed. The protection device generates a stop command 29 for stopping the engine 4 in overspeed on condition that the mechanical power requirement 19 of the rotorcraft 1 is sufficient to allow the pilot, under safe flying conditions, to modify the attitude of the rotorcraft before effective stop engine 4.

In this context, the protection device 8 has means 31 for generating the stop command 29, with the use of those means depending on detector means 9 for detecting the speed of rotation of the engine 4 and calculation means 10 for calculating the current or anticipated mechanical power required by the rotorcraft 1 as a function of its state of flight.

From speed data 11 relating to the speed of rotation of the engine 4, the detector means 9 are suitable for generating a stop order 11' for stopping the engine. Furthermore, a setpoint 12 relating to the power requirements of the rotorcraft 1 is generated by the calculation means 10 for selectively preventing or causing the engine in an overspeed situation to stop.

The setpoint 12 is generated by making use of various items of data concerning the state of flight 14 of the rotorcraft 1 as provided by on-board instrumentation 13 of the rotorcraft 1. Such flight state data 14 may be used to determine the current or anticipated mechanical power requirements of the rotorcraft 1, in particular depending on the current opposing torque 15 from the main rotor 5 and/or the flight commands 16 generated by a pilot of the rotorcraft 1. The power requirements of the rotorcraft 1 may also take account of specific requirements for power of one or more on-board equipment 6' of the rotorcraft 1.

To this end, the calculation means 10 have a first calculator 17 with means 18 for deducing by calculation the mechanical power 19 required by the rotorcraft 1 on the basis of the flight state data 14 provided by the on-board instrumentation 13 of the rotorcraft 1. By way of example, the flight state data 14 may relate at least to the opposing torque 15 generated by the main rotor 5, the first calculator 17 then deducing a current mechanical power requirement 19 of the rotorcraft 1. The flight state data 14 preferably also includes data at least about the flight commands 16 generated by the pilot of the rotorcraft, the first calculator 17 then deducing an anticipated mechanical power requirement 19 of the rotorcraft 1.

The first calculator 17 is in communication with a second calculator 20 having means 21 for making a comparison by calculation between the mechanical power requirement 19 deduced by the first calculator 17 and a predefined power threshold 22 relating to a level of mechanical power that is considered as being critical with respect to safe flying conditions for the rotorcraft 1.

The second calculator 20 includes means 53 for generating the setpoint 12 after making the comparison between the mechanical power requirement 19 of the rotorcraft 1 and said power threshold 22. Such a comparison operation makes it possible to identify the mechanical power requirement 19 is less than or greater than the power threshold 22.

The power threshold 22 is a predefined threshold of value that is potentially pre-established or having a current value that is calculated by the second calculator 20 and depending on pre-established calculation criteria that are themselves of varying values. Current values of said calculation criteria of varying values are supplied in particular by the on-board instrumentation 13 of the rotorcraft depending on the current state of flight of the rotorcraft 1 and/or depending on the conditions of the outside environment.

The architecture of the protection device 8 is such that the setpoint 12 is generated when the mechanical power requirement 19 of the rotorcraft 1 is greater than or equal to said power threshold 22 in order to prevent the engine 4 being stopped when in an overspeed situation, or conversely when the mechanical power requirement 19 of the rotorcraft 1 is less than or equal to said power threshold 22 in order to cause the engine 4 in an overspeed situation to stop.

Once an overspeed situation of the engine 4 has been identified by the detector means 9, the protection device 8 causes the engine 4 to stop depending on the setpoint 12. Whatever the way in which the setpoint 12 is generated by the second calculator 20, stopping of the engine 4 in an overspeed situation is prevented when the mechanical power requirement 19 of the rotorcraft 1 is greater than or equal to said power threshold 22 in order to give the pilot the time needed to perform a change of attitude of the rotorcraft 1 under comfortable conditions.

Figure 2:
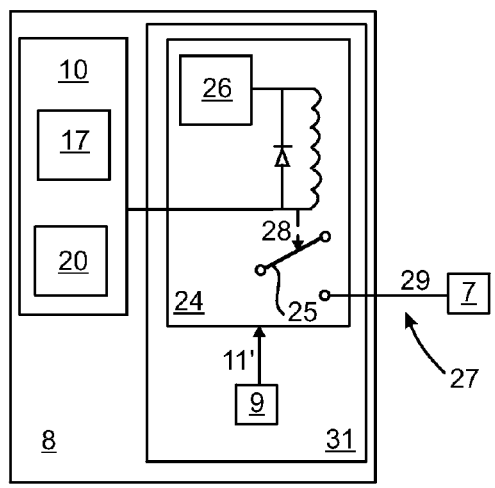
FIG. 2 is a diagrammatic representation of a first embodiment of the device shown in FIG. 1.
Figure 3:
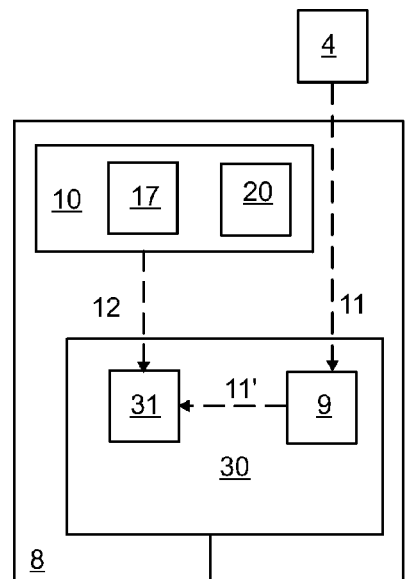
FIG. 3 is a diagrammatic representation of a second embodiment of the device shown in FIG. 1.

In FIGS. 2 and 3, a protection device 8 is in compliance with the protection device 8 shown in FIG. 1. The protection device 8 comprises in particular detector means 9 for detecting a situation of the engine being in overspeed, calculation means 10 associating said first calculator 17 and the second calculator 20, and means 31 for generating the stop command 29 for application to the regulator means 7.

In the embodiment shown in FIG. 2, the means 31 for generating the stop command 29 incorporate the detector means 9, and the stop command 29 generated by the protection device 8 is derived directly from the stop order 11'. The means 31 for generating the stop command 29 include means 24 for preventing the stop order 11' being transmitted to the regulator means 7 controlling the operation of the engine 4.

The prevention means 24 comprise a switch 25 with a relay 26 interposed in a logic path 27 for transmitting information between the protection device 8 and the regulator means 7. When the setpoint 12 identifies a mechanical power requirement 19 greater than or equal to said power threshold 22, the prevention means 24 are activated by the setpoint 12 to prevent the stop order 11' being transmitted via the logic path 27 to the regulator means 7 controlling the engine 4.

More particularly, an operation 28 of the switch 25 depends on the relay 26 being activated by the setpoint 12 in order to interrupt the hardware continuity of the logic path 27 and prevent the protection device 8 transmitting a stop command 29 derived from the stop order 11' to the regulator means 7 controlling the engine 4. Conversely, the protection device 8 is authorized to transmit a stop command 29 derived from the stop order 11' to the regulator means 7 on condition that the mechanical power requirement of the rotorcraft is identified by the second calculator 20 as being less than or equal to the predefined power threshold.

In the embodiment shown in FIG. 3, the means 31 for generating the stop command 29 and the detector means 9 are combined in a third calculator 30. The third calculator 30 constitutes a tool for processing by calculation both the setpoint 12 and said speed data 11 relating to the speed of rotation of the engine as processed by the detector means 9 for generating the stop order 11' in the event of it being detected that the engine is in an overspeed situation. The stop command 29 is generated by the third calculator 30 in the event of the stop order 11' being generated simultaneously with the setpoint 12 identifying a mechanical power requirement that is less than or equal to the predefined power threshold.

What is claimed is:

1. A method of stopping an engine of a rotorcraft when the engine is in overspeed, the rotorcraft having at least one engine driving power absorber members of the rotorcraft including at least one rotor comprising at least a main rotor having a substantially vertical axis, the method comprising:
an operation of detecting overspeed of the engine;
an operation of detecting at least one specific stage of flight of the rotorcraft, the stage of flight determining whether or not use is to be made of a protection device for stopping the engine in an event of overspeed of the engine being detected, wherein the specific stage of flight is identified by a mechanical power requirement of the rotorcraft that needs to be delivered by the at least one engine;

stopping of the engine in overspeed by the protection device depending on an operation of comparing the mechanical power requirement and a predefined power threshold, with the engine in overspeed being stopped by the protection device on condition that the mechanical power requirement is identified as being less than or equal to the predefined power threshold;

depending on current state of flight of the rotorcraft, deducing by calculating a mechanical power requirement of the rotorcraft, by identifying at least an opposing torque generated by at least one of the power absorber members including at least the at least one main rotor;

comparing the previously deduced mechanical power requirement with the power threshold and generating a setpoint identifying the mechanical power requirement relative to the power threshold; and detecting a speed of rotation of the engine and if the engine is in overspeed, stopping the engine by the protection device conditional on a previously generated setpoint.

2. A method according to claim 1, wherein the mechanical power requirement is deduced from a current value of the at least one opposing torque.

3. A method according to claim 1, wherein the mechanical power requirement is deduced from an anticipated value of the at least one opposing torque calculated from flight commands generated by a pilot of the rotorcraft for modifying blade pitch of the at least one rotor.

4. A method according to claim 1, wherein when the mechanical power requirement is identified by the setpoint as being greater than or equal to the power threshold, the protection device prevents the engine in overspeed from stopping under command of a detector used in the detecting step.

5. A method according to claim 4, wherein generation of the setpoint causes a break in continuity of a logic path for transmitting a stop order to a regulator means controlling the engine, the stop order for stopping the engine being generated by the detector identifying an overspeed situation of the engine.

6. A method according to claim 5, wherein generation of the setpoint causes a switch placed on the logic path to be operated, the operation of the switch preventing the stop order for stopping the engine being transmitted over the logic path.

7. A method according to claim 1, wherein when the mechanical power requirement identified by the setpoint is less than or equal to the power threshold, the protection device is authorized to stop the engine in overspeed under control of a detector used in the detecting step.

8. A method of controlling a rotorcraft engine, the rotorcraft engine driving a main rotor of a rotorcraft, the method comprising:

detecting a rotorcraft engine overspeed condition;

detecting a specific stage of flight of the rotorcraft based on a mechanical power requirement for the rotorcraft engine;

in response to the rotorcraft engine overspeed condition and the mechanical power requirement being less than a predefined power threshold, stopping the rotorcraft engine using an overspeed protection device;

depending on current state of flight of the rotorcraft, deducing by calculating a mechanical power requirement of the rotorcraft, by identifying at least an opposing torque generated by at least one of the power absorber members including at least the at least one main rotor;

comparing the previously deduced mechanical power requirement with the power threshold and generating a setpoint identifying the mechanical power requirement relative to the power threshold; and detecting a speed of rotation of the rotorcraft engine and if the rotorcraft engine is in overspeed, stopping the rotorcraft engine by the protection device conditional on a previously generated setpoint.

9. The method of claim 8, wherein the mechanical power requirement is determined based on an opposing torque generated by the main rotor.

10. The method of claim 8, further comprising, in response to the rotorcraft engine overspeed condition and the mechanical power being greater than the predefined power threshold, maintaining the rotorcraft engine in a running condition.

* * * * *